June 15, 1943.  G. V. NOLDE  2,321,698
NAVIGATIONAL GUIDE SYSTEM
Filed June 6, 1940  4 Sheets-Sheet 1
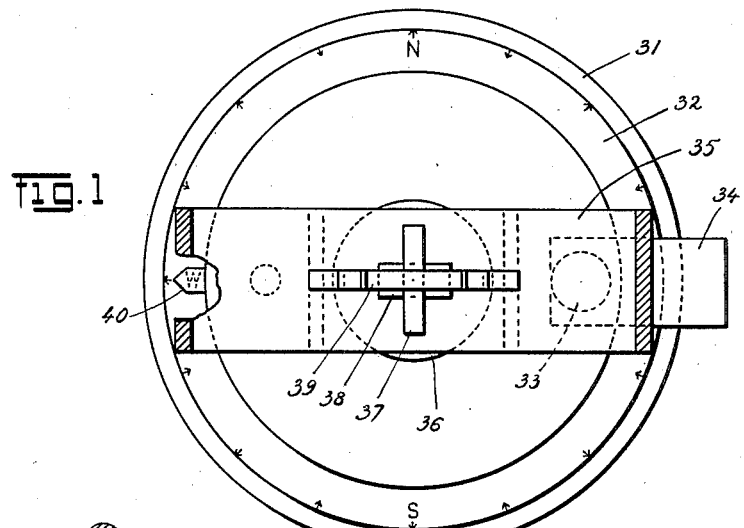
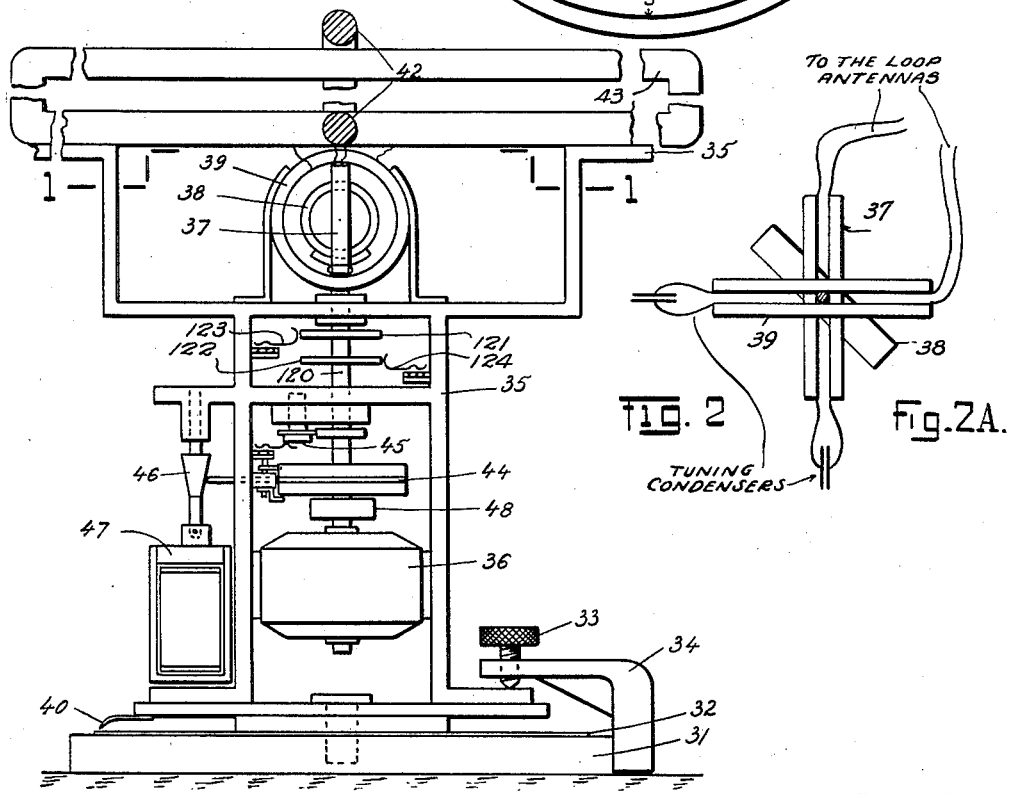
INVENTOR.
George V. Nolde June 15, 1943.   G. V. NOLDE   2,321,698
NAVIGATIONAL GUIDE SYSTEM
Filed June 6, 1940   4 Sheets-Sheet 2
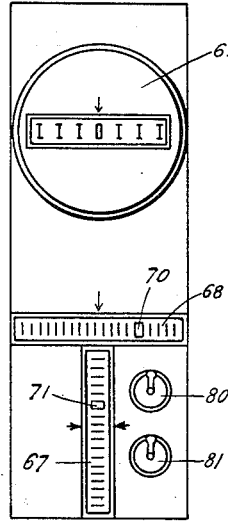
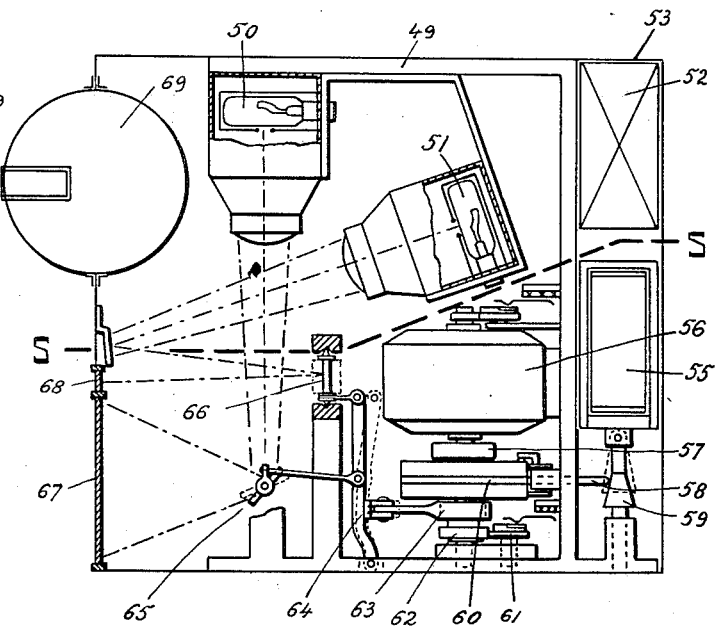
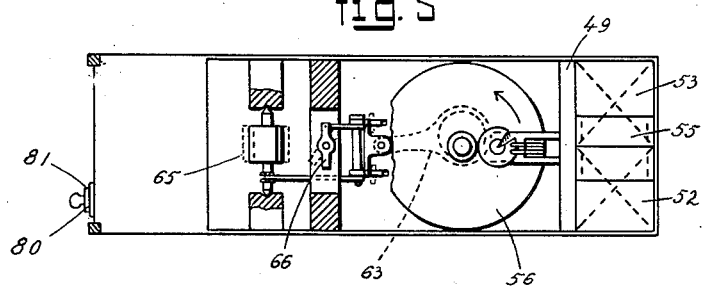
INVENTOR.
George V. Nolde June 15, 1943.　　　G. V. NOLDE　　　2,321,698
NAVIGATIONAL GUIDE SYSTEM
Filed June 6, 1940　　　4 Sheets-Sheet 3

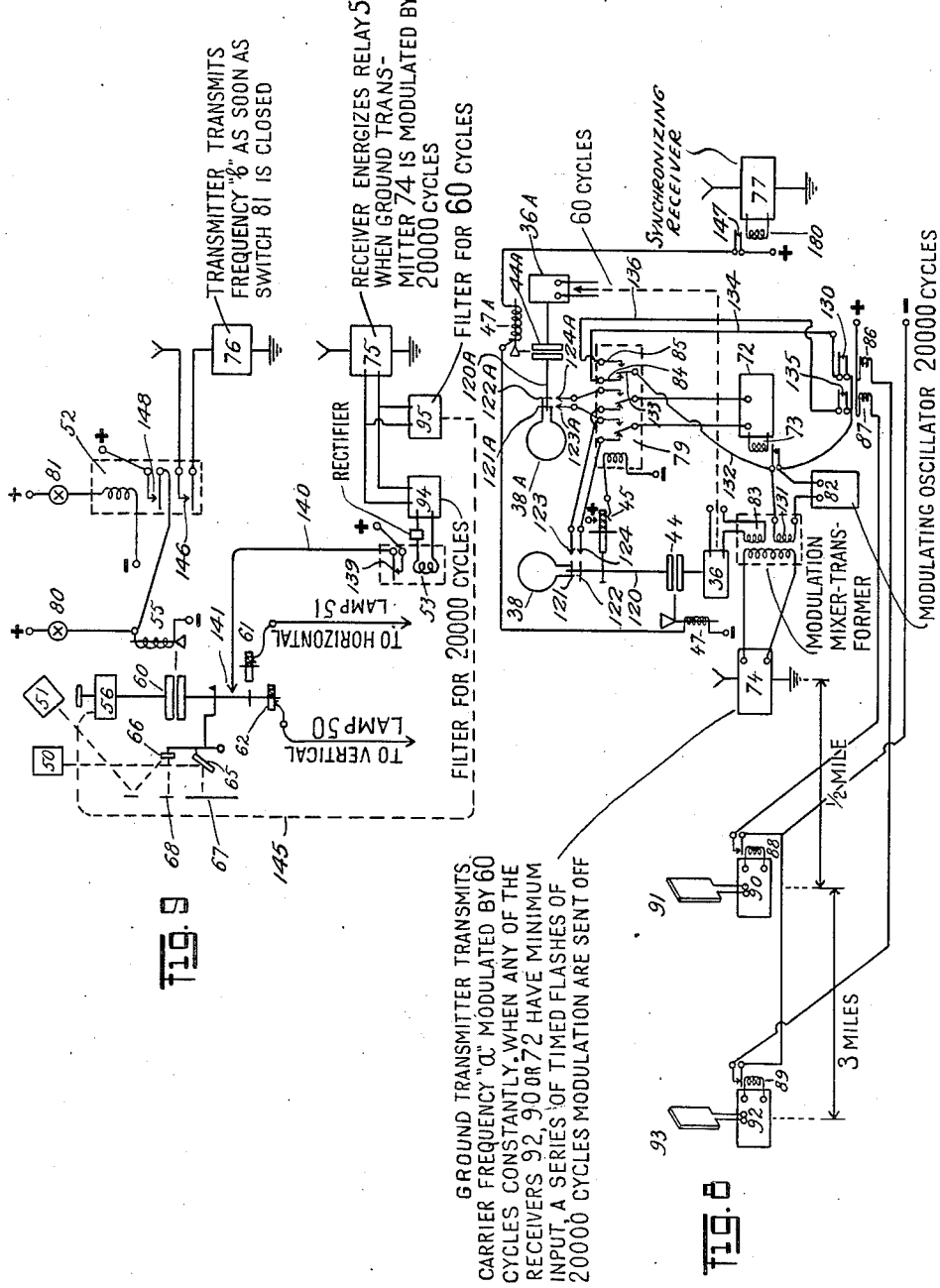

Patented June 15, 1943

2,321,698

UNITED STATES PATENT OFFICE 2,321,698

NAVIGATIONAL GUIDE SYSTEM

George V. Nolde, Berkeley, Calif.

Application June 6, 1940, Serial No. 339,160

5 Claims. (Cl. 250—11)

The herein presented invention pertains to a system composed of two groups of apparati—one located at a point on the ground relative to which an aircraft is to be oriented, while the second group is located on the aircraft itself. It is especially suited for the purposes of blind landing and/or for course direction.

The purpose of this system is to automatically show to the pilot the position of his aircraft relative to a point on the ground which is to be reached with said aircraft (as in the case of blind landing), or which is to be avoided (as in the case of this point being situated on an obstruction, such as a mountain peak, a high building, etc.).

A further purpose of this invention is to show to the pilot of an aircraft so equipped, the direction of the course by which this point is to be approached, as in landing, or avoided, as in navigation; this direction being three dimensional.

Furthermore, this invention is to achieve these results without using, in any form, a specially directed beam or beams of radiant energy located either on the aircraft or on the land.

In the herein presented system it is intended to use substantially the same type of transmitting and receiving apparatus as at present available on the craft for ordinary communication.

Another marked advantage of this system consists in the fact that boundary signals are indicated on the same instrument which is used for landing, so that the pilot's attention (usually considerably occupied with preparations for landing) is not additionally loaded by the necessity to observe more than one instrument.

A further purpose of the system described herein is to eliminate the hazard of collision between aircrafts using the same field. The presence of another craft using the field is automatically indicated on the instrument used for landing.

Another advantage of this system consists in the fact that the field equipment has only one transmitter per given landing route, the rest of the radio equipment being receivers.

Further objects will appear from the following detailed description of a preferred form of the invention, reference being had to the accompanying drawings forming a part of the specification in which:

Fig. 1 is a sectional plan view of the scanning loop antenna mechanism situated on the ground, the section being taken on the line 1—1 of Fig. 2;

Fig. 2 is a side elevation of the scanning loop antenna mechanism and the means for driving the same;

Fig. 2A illustrates the connections of the field coils and searching coils of the scanning antenna mechanism shown in Figs. 1 and 2;

Fig. 3 is a front view of the instrument situated on the instrument panel of the aircraft;

Fig. 4 is a sectional side elevation of the instrument illustrated in Fig. 3;

Fig. 5 is a sectional plan view taken on the line 5—5 of Fig. 4, showing parts of the mechanism illustrated in Fig. 4;

Fig. 6 is a schematic diagram of the system of transmitters and receivers employed in the operation of the instruments illustrated in Figs. 1, 2, 3, 4, and 5;

Fig. 7 is a simplified schematic illustration of an aircraft landing course;

Fig. 8 is a diagram of the ground equipment, including all main parts and the electrical circuits therefor;

Fig. 9 is a diagram of the equipment aboard the aircraft, including the main parts thereof and the electrical circuits therefor.

The invention described in detail hereinafter is based on a system for intermittently projecting two independent light beams on two respective screens. One of said screens is situated horizontally on the instrument panel of the aircraft for indicating the azimuth direction of the aircraft, while the second screen is situated vertically thereon for indicating the declination angle of the aircraft course. The two beams are reflected by two respective mirrors which are adapted to oscillate in timed relation to the intermittent projection of the light beams, thereby causing the beams to appear at points on the screens which are indicative of the azimuth and declination courses of the aircraft.

These light beams are emitted from two lamps 50 and 51 (Fig. 4) which are of the hydrogen filled straight filament type of incandescent lamp, whereby the light rays are emitted for only a small fraction of a second after termination of the electric current thereof. The lamp 50 is mounted on the stationary frame of the instrument, and is enclosed in a suitable enclosure including the necessary optics for focusing the light beam on a mirror 65.

Figs. 3, 4, and 5 illustrate an apparatus to be placed on the pilot's instrument panel which apparatus is to be connected to the aircraft's receiver and transmitter in the manner shown on the schematic diagram, Fig. 9.

A mounting frame 49 (Fig. 4) is placed within a covered box as shown. Hydrogen-filled straight-filament, incandescent lamps 50 and 51 are mounted on said frame. On account of the thermal characteristics of hydrogen, these filaments achieve full glow or lose incandescence within $1/10000$ of a second after application or withdrawal of current.

The image of the filament of lamp 50 (Figs. 4 and 5) is projected by an optical system onto a mirror 65, by means of which said image is reflected onto a vertical screen 67. The image of the filament of lamp 51 is similarly projected by its optical system and reflected by a mirror 66 onto an horizontal screen 68. Both screens are translucent and covered with some fluorescent matter with an afterglow period of 0.15 or 0.2 second.

Mirror 66 when at rest, is in a position to throw the image of the filament of the lamp 51 on the extreme left end of the screen 68, Fig. 3. When in its initial position, the mirror 65 reflects the image of the lamp 50 onto the extreme lower end of the screen 67. When the eccentric 63 makes one half of the revolution, mirrors 65 and 66 respectively make one half of an oscillation, and if the lamps 50 and 51 are lighted their images would appear on the opposite ends of the screens 67 and 68 respectively: i. e., the image of the filament of lamp 50 appears at the top of screen 67, and the image of the filament of lamp 51 appears at the right end of screen 68.

During the second half of a revolution of the eccentric 63, the mirrors 65 and 66 return into their initial positions.

A synchronous self-starting motor 56 rotates at a constant speed, and is adapted to drive an "indexed starting clutch" 60, which operates as follows:

When the solenoid 55 is not energized, the part of the clutch connected to the shaft of the motor 56 rotates with it as a whole, whereas the part of the clutch connected to the shaft which carries the eccentric 63 and a commutating disc 62, is stopped in a definite angular position relative to the frame 49. A second commutating disc 61 is driven at the same speed as disc 62 by means of a gear connection. When the solenoid 55 is energized, it causes engagement of the clutch 60 which drives the eccentric 63 and the commutating discs 61 and 62 at the same speed as the motor. Deenergization of the solenoid 55 causes disengagement of the clutch 60, thereby stopping said eccentric and commutating discs in their initial angular positions. The specific structure of this clutch may be chosen from any of the numerous types known in the art. This particular method of using such clutches for phasing of two rotatable members is described in greater detail in my copending application Serial Number 485,732, filed May 5, 1943. A relay 52 is controlled by a switch 81, normally open and located on the front panel of the instrument. When this switch is closed by the pilot, the relay 52 is energized, which causes energization of the solenoid 55 (Figs. 4, 5, and 9), thereby causing engagement of the clutch 60. The relay 52 simultaneously with the above, connects an aircraft transmitter 76 to its antenna as shown in Fig. 9.

A relay 53 (Figs. 5 and 9) is energized whenever the aircraft receiver 75 receives a radio signal having high audio frequency modulations from the ground transmitter 74 (Fig. 8).

When this occurs, relay 53 closes the circuit and energizes either lamp 50 or 51 depending upon the position of commutators 61 and 62. In the first half of each revolution of the eccentric 66 the relay 53 controls lamp 51, whereas during the second half revolution thereof, the lamp 50 is subject to control by said relay 53.

There are two apparati such as shown in Figs. 1 and 2, which are located on the ground and connected to the ground transmitter 74, and also to the two ground receivers 72 and 77 as shown diagrammatically in Fig. 8. One of said apparati, referred to hereinafter as the declination goniometer, is positioned to detect the direction, in a vertical plane, from which the signals are transmitted from the aircraft transmitter. The second one of said apparati, referred to hereinafter as the azimuth goniometer, is positioned to detect the direction, in a horizontal plane, from which the signals are transmitted from said aircraft transmitter. The parts illustrated in Figs. 1, 2, and 2A and identified by the reference numerals 37, 38, 39, 42 and 43 comprise what is known in the art as a Bellini-Tosi radio goniometer.

There are many descriptions of such a system. For example, reference may be had to "Goniometer" in "S. Gernsbach's Radio Encyclopedia," (1931, second edition S. Gernsbach Co., New York). Coil 38 (Figs. 1, 2, and 2A) is an "exploring" or "searching" coil of said system, and coils 39 and 37 are "main windings" or "field coils."

It is well known that the action of an exploring coil such as coil 38 is equivalent to the action of a single loop antenna, i. e., the coil 38 has a minimum reception when the plane of said coil is perpendicular to the plane along which the radio signal propagates.

It should be understood, however, that the field coils 39 and 37 and their associated exploring coil 38 could be placed at a distance from the loops 42 and 43, having only a wiring connection to the latter instead of being mechanically associated as shown in Figs. 1 and 2, without changing the principle of operation as hereinafter presented.

Fig. 2A shows the electrical circuit of the field coils 37 and 39, whereas the coil 38 coacts with these field coils through electro-magnetic induction. The searching coil 38 (Fig. 2) is mounted on, and insulated from the shaft 120 which is driven by a clutch 44. Also mounted for rotation with said shaft are two collector rings 121 and 122 which are insulated from each other and from the shaft 120. These rings are connected to the two outlet leads of the coil 38 and cooperate with the brushes 123 and 124 so as to connect the coil 38 to its associated circuit. A commutator 45 is mounted on the frame 35 and is adapted to be driven at the same speed as shaft 120 by a gear train connecting the shaft with the commutator, the function of said commutator being described hereinafter.

A synchronous self-starting motor 36, rotates at a constant speed and is adapted to drive the indexed starting clutch 44 which operates as follows: When the solenoid 47 is not energized, the part of the clutch connected to the shaft of motor 36, rotates with it as a whole, whereas the driven part of the clutch which is connected to the shaft 120 is stopped in a definite angular position relative to the frame. When the clutch and shaft 120 are thus stopped, the plane of the coil 38 coincides with a plane passing through the pointer 40 and the center of shaft 120 as shown in Figs. 1 and 2.

When the solenoid 47 is energized, it causes engagement of the clutch 44 which drives the shaft 120, coil 38, collector rings 121 and 122, and the commutator 45 at the same speed as the motor. Deenergization of the solenoid 47 causes disengagement of the clutch 44, thereby stopping said parts in their initial angular positions.

As described hereinbefore there are two goniometers on the ground which have their principal axes in two mutually perpendicular planes, said principal axes being coincident with the axes of the respective motor and clutch shafts. The azimuth goniometer has its principal axis vertical, while the declination goniometer has its principal axis horizontal. Since both goniometers are the same except for the position in which they are mounted, only one is illustrated. The parts of the azimuth goniometer shown in Figs. 1 and 2 are illustrated diagrammatically in Fig. 8 and identified by like reference numerals, whereas the corresponding parts of the declination goniometer are identified in Fig. 8 by like numerals with the letter A added, as for example, the reference numeral 38 (Figs. 2 and 8), denotes the azimuth goniometer searching coil, while the reference character 38A (Fig. 8) denotes the declination goniometer searching coil.

To establish the desired course of landing the whole frame 35 (Fig. 2) of the azimuth goniometer is initially turned on its base 31 by the airdrome attendant, and set in such a position that the direction indicator 40 (Fig. 1) points in the azimuth direction of the runway, along which the aircraft landing is prescribed. Similarly, the direction indicator of the declination goniometer is set to the prescribed angle of the landing glide.

Figs. 8 and 9 show the wiring diagram of the invention in which Fig. 9 illustrates diagrammatically the apparatus carried by the aircraft.

In ordinary flight an aircraft has a receiver 75 (Fig. 9) and a transmitter 76 connected for ordinary communication service, or the receiver 75 may be connected to receive course-directional beacon signals and telephone communication, as desired. As soon as the aircraft enters the cone of silence of his ordinary navigational beacon or otherwise receives an "over-beacon" signal, the pilot tunes his receiver 75 to a predetermined frequency $a$, and his transmitter 76 to a predetermined frequency $b$. This automatically starts his landing instrument motor 56 (Fig. 9), due to the fact that the landing frequency of the field transmitter 74 (Fig. 8) is constantly modulated by a synchronizing frequency for which the motors 56, 36, and 36A are adapted.

In the center of the airfield, there is a receiver 77 for non-directional receiving, and a receiver 72 to operate in conjunction with the searching coils 38 and 38A. In addition to these receivers, there are two other receivers 90 and 92 located alongside the main landing runway. Each of the latter receivers is connected to its respective directional antenna 91 and 93. The orientations of the antennas 91 and 93 are such that their respective receivers do not have any input when an aircraft transmitter operating on a frequency $b$ passes overhead, whereas when said aircraft transmitter is in any other position, the receivers 90 and 92 receive their operating signals from their respective antennas. These receivers serve to institute what are known in the art as "boundary crossing" signals. The manner in which such signals are used to indicate the passing of the aircraft over the airfield boundary lines, will be described hereinafter.

The motors 36 and 36A (Fig. 8) operate continuously during the time the presently described system is in use. The current supply for these motors is derived from the local source of alternating current and drives said motors at a synchronous speed. This current also passes through one of the primary windings of the modulator transformer 83 as shown in Fig. 8, thereby modulating the wave of the non-directional ground transmitter 74. This transmitter is in continuous operation and transmits the frequency $a$ to which the aircraft receiver 75 (Fig. 9) is tuned during the landing of the aircraft.

The other primary winding of the transformer 83 (Fig. 8) is connected in the circuit of the high audio frequency oscillator 82 as shown. The high audio frequency current from the oscillator 82 may therefore be periodically impressed upon the wave of the transmitter 74 in addition to the above mentioned synchronizing current. This periodic modulation by oscillator 82 is subject to control by the two searching coils 38 and 38A and their receiver 72, and alternatively by the two receivers 90 and 92 as will be described hereinafter.

When there is no aircraft transmitter in the vicinity of the airfield which transmitter emits the frequency $b$, to which the ground receivers 77, 72, 90, and 92 are tuned, relays 89 and 88 are deenergized and their contacts closed due to no input to their respective receivers.

The windings of the two relays 86 and 87 are in series with the contacts of relays 89 and 88 respectively, as shown in Fig. 8, and are thus energized when the latter contacts are closed. Energization of the relay 86 causes closure of its contacts 130, which close the circuit including oscillator 82, winding 131 of the transformer 83, lead 132, contacts 133 and 84 of the relay 79, and lead 134.

When the relay 79 described hereinafter is in deenergized condition, the contacts 133 and 85 are closed so that energization of relay 87 and closure of its contacts 135, close the circuit including oscillator 82, winding 131, lead 132, contacts 133 and 85, and lead 136. In this way, the high audio frequency current from oscillator 82 is impressed upon the transmitter 74 when no signals are received by receivers 90 or 92. When, however, an aircraft is in the vicinity of the airfield but outside the zone of minimum reception of said directional antennas 91 and 93, and the transmitter aboard said aircraft emits a radio signal of frequency $b$, the relays 88 and 89 are energized and their respective contacts are opened, which condition leaves oscillator 82 solely under control of relay 73. This relay 73 (Fig. 8) is controlled by the output of the receiver 72 in such a way that when this receiver has a minimum input, relay 73 closes its contacts, which complete the circuit through the oscillator 82 and windings 131 of the transformer 83, thereby causing the radiation from the transmitter 74 to be modulated by the frequency of the modulating oscillator 82 in addition to the motor synchronizing frequency with which said radiation is constantly modulated.

The input of receiver 72 is alternately connected to the goniometric exploring coils 38 and 38A by the multi-contact relay 79 as shown, which relay is controlled by the commutator 45. During the first half revolution of the clutch 44 and commutator 45 (Figs. 8 and 2), the relay 79 is energized and the relay switches assume the position in which they are shown in Figure 8, and connect the receiver 72 to the searching coil 38 of the azimuth goniometer. During the second half revolution of said clutch and commutator, the relay 79 is deenergized and the relay switches move from the positions shown, to close their opposite respective contacts. Closure of said latter contacts connects the receiver 72 to the searching coil 38A of the declination goniometer.

When the searching coil 38 (Fig. 8) of the azimuth goniometer is connected to the receiver 72 it delivers to said receiver a signal of continually changing strength, in accordance with the rotation of said coil. When the plane of the coil is perpendicular to the vertical plane passing through the goniometer and the aircraft antenna, the signal is at its minimum strength. At this instant the relay 73 is deenergized and closure of its contacts enables the oscillator 82 to modulate transmitter 74 in accordance with the frequency of the oscillator. Upon continued rotation of the searching coil 38 past the point at which the plane thereof is perpendicular to said vertical plane, the strength of the reception increases and causes energization of the relay 73, which stops the modulation of the transmitter 74 by the oscillator 82. In this way the transmitter 74 emits an instantaneous signal of the frequency $a$, modulated by the frequency of oscillator 82 in addition to the constantly present frequency of the motor synchronizing current.

When the searching coil 38A of the declination goniometer is connected to the receiver 72 it delivers to said receiver, a signal of constantly changing strength in accordance with the rotation of the coil 38A. When the plane of the coil is perpendicular to the plane passing through the axis of the declination goniometer and the aircraft transmitting antenna, the signal is at its minimum strength. As explained hereinbefore, the declination goniometer is connected to receiver 72 during the second half revolution of the clutch 44; therefore, coil 38A controls the relay 73 and its associated circuit in exactly the same way as described in connection with the searching coil 38, and causes a second instantaneous signal during each revolution of the motor 36 and clutch 44, which signal is similarly characterized by high audio frequency modulation in the carrier wave of the transmitter 74.

It should be understood at this point that the transmitter emits a continuous carrier wave and that the term "instantaneous signal" denotes an instantaneous change in characteristic of said wave, namely, the instantaneous superimposition of a high audio frequency upon said continuous carrier wave. This continuous carrier wave is received by the aircraft receiver 75, and the motor synchronizing frequency of this wave is filtered out by a filter 95. The alternating current from said filter is conducted to the motor 56 by a suitable line 145 (Fig. 9) and in this way the motor 56 is constantly driven at a speed which is synchronous with that of motors 36 and 36A (Fig. 8).

A relay 53 (Fig. 9) is controlled by the aircraft receiver 75 through a high audio frequency filter 94, so that when said receiver receives the above described instantaneous signal, it causes energization of relay 53 and closure of its contacts 139, which contacts close the circuit from the plus side of a power supply line aboard the aircraft, through lead 140, brush 141, commutator discs 61 and 62 and therefrom to lamps 51 or 50, respectively. During the first half revolution of the commutators, the lamp 51 is connected into the circuit of the relay contacts 139, whereas during the second half revolution of said commutators the lamp 50 is connected into the circuit of the relay contacts 139. Reception of said instantaneous signal by receiver 75 therefore causes instantaneous closure of contacts 139 which cause the lamp 50 or 51 to light for the duration of said instantaneous signal.

From the foregoing, it may be seen that the periods during which the lamps 50 and 51 (Fig. 9) are lighted depends upon the movement of the ground searching coils 38A and 38, respectively, which are driven by clutches 44A and 44 (Fig. 8), and that the oscillation of the mirrors 65 and 66 is dependent upon the speed and phase of rotation of the clutch 60. It will be explained hereinafter how the aircraft transmitter 76 and the ground synchronizing receiver 77 and related mechanism, synchronize the speed and phase of the three clutches 60, 44, and 44A, thereby synchronizing the ground searching coils and their respective aircraft mirrors.

Upon approach to the landing field the pilot tunes his receiver 75 and transmitter 76 (Fig. 9) to the landing frequencies $a$ and $b$, respectively, which starts the aircraft instrument motor 56 rotating as explained hereinbefore. Immediately thereafter he turns on the switch 80, which causes energization of the clutch solenoid 55 (Figs. 9, 4, and 5) described hereinbefore. Consequent engagement of the clutch 60 causes oscillation of the mirrors 65 and 66, and rotation of the commutators 61 and 62 also described in connection with Figures 4 and 5. The transmitter 76 is not connected to its antenna at this time because the contacts of the relay 52 (Fig. 9) are open. The ground receiver 72 (Fig. 8) therefore does not receive any landing signals from the instant aircraft transmitter, and the modulations from the oscillator 82 are impressed continuously upon the carrier wave from transmitter 74. The resulting signal therefore causes closure of the relay switch 139 (Fig. 9), for reasons described hereinbefore, which relay switch closes the circuits through the lamps 50 or 51, so that the lamp 51 glows throughout one-half revolution of the commutators 61 and 62 and the lamp 50 glows throughout the other half revolution of said commutators. This glow of the lamps concurrently with the oscillation of the mirrors produces a complete illumination of both screens 67 and 68 (Figs. 3 and 9), thereby indicating that there are no other aircraft signalling for a landing or take-off, and that the instant aircraft has the right of way for landing. Immediately upon receipt of this right of way indication, the pilot releases switch 80 which is self-restoring and then he turns on the switch 81 (Fig. 9), which latter switch energizes relay 52 and causes the relay switch 146 to close the circuit from the transmitter 76 to its antenna. As described hereinbefore transmitter 76 is tuned to frequency $b$ and therefore transmits a wave of this frequency, which wave is received by the ground receiver 77 (Fig. 8), whereupon the relay 180 is energized. Closure of the relay switch 147 causes simultaneous energization of the solenoids 47A and 47 and consequent engagement of their respective clutches 44A and 44.

Energization of relay 52 (Fig. 9) also causes closure of a second switch 148, energization of the solenoid 55, and engagement of the clutch 60. From the foregoing description it may be seen that closure of switch 81 therefore causes simultaneous engagement of clutches 44, 44A, and 60. From the description of Figs. 1, 2, 3, 4, and 5, the operation of these clutches as described hereinbefore causes the searching coils 38 and 38A (Fig. 8), the mirrors 65 and 66 (Fig. 9), and the commutators 45, 61 and 62, to all operate in synchronism.

The arrangement and timing of these elements is such that during the first half revolution of the clutches, the mirror 66 moves counter-clockwise (Fig. 5), and the image of the lamp which it projects, moves from the left to the right of screen 68 as viewed from the front of the instrument shown in Fig. 3. Also during said first half revolution, the commutator 61 (Fig. 9) connects lamp 51 to the lamp circuit described hereinbefore, and commutator 62 disconnects lamp 50 from said circuit. At this same time the mirror 65 moves clockwise (Fig. 4) on its axis whereby the image of the lamp 50 moves from its down position to its up position on screen 67.

Concurrently with the above half revolution the ground apparatus operates as follows, namely, the searching coil 38 (Fig. 8) is rotated by clutch 44 from a position in which the plane of the coil is coincident with the prescribed course of the aircraft, through 180° in a counter-clockwise direction as viewed from the top of Figure 1. During the same half revolution of clutch 44, the commutator 45 causes the coil 38 to control the transmitter 74 by means of the coaction of the relay 79, receiver 72, oscillator 82 and transformer 83 described hereinbefore; whereas the coil 38A at this time is out of the circuit and rotates idly through 180° in the direction indicated by the arrow in Fig. 7, without exerting any control on the transmitter 74.

During the second half revolution of clutches 60, 44, and 44A, the mirror 65 (Fig. 9) moves counter-clockwise to its initial position, and the commutator 62 connects lamp 50 to the lamp circuit; whereas commutator 61 disconnects lamp 51 from said circuit while its respective mirror 66 returns to its initial position. Concurrently with the above movements, the commutator 45 (Fig. 8) causes deenergization of the relay 79 which disconnects coil 38 from the ground transmitter control circuit described hereinbefore, so that only the coil 38A controls said transmitter during said second half revolution. The coil 38 rotates idly through its second half revolution while coil 38A also rotates through its second half revolution but which latter coil controls the apparatus in a manner described immediately hereinafter.

The exercise of control of coil 38A over the apparatus for indicating the declination position of the aircraft with respect to the prescribed course, is illustrated in Fig. 7. In the following description of this figure it may be held in mind that the explanation is equally applicable to the coil 38 and its associated azimuth indicating mechanism when considered during the first half revolution of the apparatus.

The pointer 40 (Fig. 1) of the azimuth goniometer is set to the prescribed course as described hereinbefore and an identical pointer 40A (not shown) of the declination goniometer is similarly set to the prescribed angle of glide or approach to the airfield. When the pointer 40A is so set, the coil 38A assumes the position in which it is shown in Fig. 7, at the beginning of the second half revolution thereof, and rotates 180° in the direction of the arrow. If the aircraft is on the prescribed course, the plane of the coil 38A will be perpendicular to the line of flight when the coil has passed through 90° of said half revolution, at which instant it will have a minimum of reception, thereby causing the transmitter 74 (Fig. 8) to emit an instantaneous signal explained hereinbefore, and to cause the lamp 50 (Fig. 9) to light for said instant. Concurrently with the movement of the coil 38A through half of its half revolution, the mirror 65 will move through half of its counter-clockwise movement, thereby projecting the instantaneous flash of the image of the lamp 50 on the center of the screen 67 (Fig. 9). This operation will repeatedly occur during each second half revolution of the apparatus and said image will therefore repeatedly appear on the center of the screen so long as the aircraft continues to follow the prescribed course. If, however, the aircraft is below the prescribed course as shown by the line 176 (Fig. 7), the coil 38A will rotate through more than 90° before it reaches the point of minimum reception and the mirror 65 also will move through more than half of its counter-clockwise oscillation when the lamp is caused to flash, in response to said minimum reception. The image of the lamp will therefore repeatedly appear below the center of the screen 67 so long as the aircraft is below the prescribed course.

Similarly, if the aircraft is above the prescribed course the repeated flashes of lamp 50 will occur earlier in the cycle and the image thereof will appear above the center of the screen 67.

The setting of pointer 40 (Fig. 1) to a position indicative of the prescribed course, namely, the azimuth direction of approach for landing, initially positions the coil 38 so that the plane of said coil is initially coincident with the prescribed line of approach. If the aircraft is on the prescribed course, receiver 72 will have a minimum reception when the coil 38 has rotated 90° of the first half revolution thereof, and will cause the lamp 51 to repeatedly flash at the same time in each successive first half revolution. The mirror 66 will have completed half of its counter-clockwise oscillation at the time the lamp flashes thereby projecting the image of the lamp 51 on the center of the screen 68 (Fig. 3) during each first half revolution of the clutch 60 so long as the aircraft follows the prescribed course. If, however, the aircraft is to the left of the course, the minimum reception and the consequent flash of lamp 51 will occur before the mirror 66 completes half of its counter-clockwise oscillation, thereby causing the image of lamp 51 to repeatedly appear to the left of the center of screen 68 (Fig. 3); whereas if the aircraft is to the right of its prescribed course the flash of lamp 51 will occur later in the cycle and the image of lamp 51 will repeatedly appear to the right of the center of screen 68.

The positions of the projected images 70 and 71 (Fig. 3) indicate that the aircraft is to the right and above the prescribed course. Before landing, the pilot should guide his plane to the left and should decrease his altitude until the images 70 and 71 appear at the centers of screens 66 and 67, respectively.

The instrument 69 is a meter which is controlled by the intensity of reception by the receiver 75 (Fig. 9), of the signal from the transmitter 74 (Fig. 8) and is calibrated roughly in miles for indicating the distance of the aircraft from the landing field. Its indications aid the pilot so that he will know if he has "overshot" the field.

The contacts 84 and 85 of relay 79 (Fig. 8) do not have any control over the transmitter 74 until the landing aircraft passes over the first boundary receiver 92 and its antenna 93.

Such passage of the aircraft over said receiver is indicated by the continuous illumination of the whole azimuth screen 68 which illumination is produced by the coaction of the elements of the apparatus as follows. The receiver 92 (Fig. 8) receives a minimum signal when the aircraft passes overhead, and as described hereinbefore deenergizes relays 89 and energizes relay 86, which latter relay causes closure of the circuit, including switch 130, lead 134, contact 84, modulator transformer winding 131 and oscillator 82. The closure of this circuit is maintained during each first half revolution of clutch 44 and commutator 45 by the consequent energization of relay 79 and closure of the contacts 84 and 133 explained hereinbefore. The transmitter 74 is therefore modulated by oscillator 82 for the entire first half revolution of clutch 44 instead of for only an instant as in the case when said transmitter is under control of the coil 38, receiver 72 and relay 73. The high audio frequency modulations thus produced cause lamp 51 to glow for the duration of each first half revolution of clutch 60 and each counter-clockwise oscillation of mirror 66, thereby causing the entire screen 68 to glow for the period during which the aircraft is passing over the zone of minimum reception of antenna 93 and receiver 92. This glow of the screen 68 indicates the preliminary boundary signal.

When the aircraft passes over the zone of minimum reception of antenna 91 (Fig. 8), the receiver 90 similarly causes deenergization of the relay 88 and energization of relay 87, and consequent closure of switch 135. Closure of contacts 85 and 133 during the second half revolution of clutch 44 and commutator 45 as explained hereinbefore, closes the circuit including leads 136 and 132, and thus causes the transmitter 74 to emit high audio frequency modulations during the second half revolution of clutch 44, in exactly the same way as explained in connection with the closure of contacts 84 and 133 during the first half revolution of clutch 44. Reception of said modulations by receiver 75 causes the lamp 50 to glow throughout each second half revolution of clutch 60 and during the counter-clockwise movement of mirror 65, thereby causing the entire screen 67 to glow during each second half revolution of said clutch. This glow of screen 67 indicates the main boundary signal, after which the pilot prepares for landing.

It should be understood that all components of the apparatus which are shown in the drawings and described herein are illustrative of a preferred embodiment only and equivalent elements could be substituted therefor, as for example, where loop antennas are shown as being of the Bellini-Tosi type, any other radio goniometer antenna could be used.

On the diagram shown in Fig. 9, the relay 75 controlling the output of the transmitter 76 is shown as connected directly into the antenna circuit, whereas control of the transmitter could be accomplished by conventional means. All these and other simplifications should not be considered as limiting the scope of the above-described system.

It may be seen that if there is another aircraft in the vicinity of the airfield or one which is taking off or landing when the pilot of the instant aircraft turns on the switch 80 (Fig. 9), sharply defined images of lamps 50 and 51 will appear on his screens instead of the constant glow. This will show to the pilot the necessity of cruising outside the field to avoid danger of collision.

The moment the other aircraft transmitter is turned off, following completion of such landing or take-off, the screens of the instant pilot's instrument will glow as described hereinbefore, after which said pilot turns on his switch 81 which connects his transmitter 76 to its antenna and starts the clutch 60 operating in synchronism with the landing goniometer searching coils 38 and 38A.

It will also be seen that the position of the other aircraft will not be indicated correctly on the instant screens because the mirrors for the latter will be out of phase with the landing signals for said other aircraft.

The ultimate embodiment of the aircraft instrument could undergo different modifications and yet be within the scope of the above outlined invention.

For instance, the motor synchronizing frequency could be applied directly to numerous other instrumentalities such as to oscillating coils, or magnetic armatures which may be adapted to oscillate said mirrors. Furthermore, the light beams from the lamps 50 and 51 could be substituted by electronic oscillograph beams activated by the output from the filter 94 (Fig. 9) and oscillated by the output from the filter 95.

I claim:

1. In an aircraft course directing system, the combination of; a transmitter aboard an aircraft, a first receiving antenna on the ground having a directionally oriented zone of sensitivity of reception, a first means for effecting periodically recurrent motion of said zone of sensitivity about a vertical axis, a second receiving antenna on the ground having a directionally oriented zone of sensitivity of reception, a second means for effecting periodically recurrent motion of said zone of sensitivity about an horizontal axis, a ground receiver for receiving radiant energy from said aircraft transmitter through said directionally sensitive antennas, switching means for repeatedly connecting said first antenna and then said second antenna alternately to said ground receiver for subjecting said receiver to the influence of one and then the other of said antennas to thereby effect a periodic output of said receiver according to the periodically recurrent motions of said zones, a ground transmitter controlled by said ground receiver for transmitting signals in response to said periodic output of the ground receiver, a receiver aboard said aircraft for receiving said signals, and means controlled by said aircraft receiver for indicating the azimuth and declination angles of the course of the aircraft in accordance with the signals received by said aircraft receiver.

2. In an aircraft course directing system, the combination of; a source of radiant energy at an aircraft, an antenna on the ground having a directionally oriented zone of sensitivity of reception, a master receiver on the ground for receiving radiant energy from said source through said directionally sensitive antenna, means for effecting periodically recurrent motion of said zone to thereby effect a corresponding periodic output of said receiver, a ground transmitter controlled by said master receiver for transmitting signals in response to said periodic output of the ground receiver, a receiver aboard said aircraft for receiving said signals, a screen on the aircraft, means for projecting an indicating beam on said screen including, a beam emitting means controlled by said aircraft receiver, and a beam directing means, a device for causing said beam directing means to move said beam across said screen, means for synchronizing the action of said device with the motion of the zone of sensitivity of said ground antenna to indicate the course of the aircraft in response to the coordinated action of said beam emitting means and said beam directing means.

3. An aircraft course directing system as described in claim 2 having means for indicating upon said aircraft screen a signal indicative of the movement of said aircraft across a boundary of an airdrome, comprising; a boundary receiver on the ground, a device controlled by the output of said boundary receiver for causing said ground transmitter to emit boundary signals, and including, means for rendering said master receiver ineffective to control said ground transmitter, an antenna having a zone of oriented sensitivity fixed relative to said airdrome boundary for controlling said boundary receiver in response to signals from said aircraft transmitter.

4. In an aircraft course directing system, the combination of; a radio transmitter on the ground for transmitting periodical course directing signals, a receiver aboard an aircraft for receiving said signals, a first screen aboard said aircraft, means for projecting an azimuth indicating beam on said screen including, a beam emitting means periodically controlled by said aircraft receiver, and a beam directing means, a device for causing said beam directing means to move said azimuth beam across said first screen, a second screen aboard said aircraft, means for projecting a declination indicating beam on said second screen including, a declination beam emitting means also periodically controlled by said aircraft receiver, and a declination beam directing means, a device for causing said last mentioned means to move said declination beam across said second screen, switching means for periodically connecting said receiver to said azimuth beam emitting means and alternatively to said declination beam emitting means, and means for synchronizing said azimuth and declination beam directing means and said switching means with the periodic signals from said ground transmitter.

5. A method of preventing collisions and establishing right of way of aircrafts, each of said aircrafts having a receiver and a transmitter on board for receiving and transmitting radio signals, said method comprising; transmitting signals from a first aircraft, receiving said signals on the ground, establishing answer-back signals from the ground to be received by a plurality of aircrafts including the first, controlling the characteristic of said answer-back signals according to said signals from the first aircraft, receiving said answer-back signals by the receiver of a second aircraft and controlling the transmission by the transmitter of said second aircraft according to the characteristic of the answer-back signals, in order to prevent transmission of interfering signals from said second aircraft.

GEORGE V. NOLDE.